(12) United States Patent
Andersson et al.

(10) Patent No.: US 8,117,940 B2
(45) Date of Patent: Feb. 21, 2012

(54) STEERING WHEEL ARRANGEMENT

(75) Inventors: Björn Andersson, Onsala (SE); Hassan Omarain, Askim (SE); Andreas Alvehav, Kungälv (SE); Thomas Paulsson, Skogstorp (SE); Hans Fredriksson, Torshälla (SE); Ulf Eriksson, Eskilstuna (SE); Pentti Hyvönen, Eskilstuna (SE)

(73) Assignees: Volvo Lastvagnan AB, Gothenburg (CH); Fuji Autotech AB, Eskilstuna (CH)

( * ) Notice: Subject to any disclaimer, the term of this patent is extended or adjusted under 35 U.S.C. 154(b) by 806 days.

(21) Appl. No.: 12/091,755

(22) PCT Filed: Oct. 28, 2005

(86) PCT No.: PCT/SE2005/001628
§ 371 (c)(1),
(2), (4) Date: Oct. 7, 2008

(87) PCT Pub. No.: WO2007/050004
PCT Pub. Date: May 3, 2007

(65) Prior Publication Data
US 2009/0173180 A1    Jul. 9, 2009

(51) Int. Cl.
*B62D 1/18* (2006.01)
*B62D 1/16* (2006.01)
*B64C 13/30* (2006.01)
(52) U.S. Cl. ......... 74/493; 74/495; 74/501.5 H; 280/775
(58) Field of Classification Search .............. 74/492, 74/493, 494, 495, 501.5 H, 478; 280/771, 280/775, 779; 248/284.1, 291.1
See application file for complete search history.

(56) References Cited

U.S. PATENT DOCUMENTS

| | | | | |
|---|---|---|---|---|
| 5,126,731 A * | 6/1992 | Cromer, Jr. | | 340/4.11 |
| 5,168,768 A | 12/1992 | Easton | | |
| 5,259,264 A | 11/1993 | Bodin et al. | | |
| 5,737,970 A * | 4/1998 | Asbrand et al. | | 74/492 |
| 6,213,912 B1 * | 4/2001 | Malone | | 477/99 |
| 2004/0163488 A1 * | 8/2004 | Reimann et al. | | 74/512 |

FOREIGN PATENT DOCUMENTS

| | | |
|---|---|---|
| EP | 0594173 A1 | 4/1994 |
| EP | 0841236 A2 | 5/1998 |

OTHER PUBLICATIONS

International Search Report from corresponding PCT/SE2005/001628.
Written Opinion from corresponding PCT/SE2005/001628.

* cited by examiner

*Primary Examiner* — James Pilkington
*Assistant Examiner* — Adam D Rogers
(74) *Attorney, Agent, or Firm* — WRB-IP LLP

(57) ABSTRACT

A steering wheel arrangement for a motor vehicle includes a steering column having a first end for cooperation with a steering wheel and a second end for cooperation with a vehicle steering mechanism. The steering wheel arrangement further includes a suspension arrangement for the steering column. The suspension arrangement includes two pivot joints and is pivotally connected to the steering column via a third pivot joint, the first, second and third pivot joints including first, second and third locking arrangements, respectively. The steering wheel arrangement has thus three adjustable pivot points where only one or two of the three pivot joints are adjustable in a first step depressing a foot pedal to a first position and only the remaining of the three pivot joints are adjustable in a second step depressing the foot pedal to a second position which implies that the adjustments can be made in a secure way by the driver during the ride.

14 Claims, 5 Drawing Sheets

STEERING WHEEL ARRANGEMENT

BACKGROUND AND SUMMARY

The present invention relates to a steering wheel arrangement for a motor vehicle.

To attain an ergonomic environment for drivers of vehicles, several solutions have appeared. One example is to provide an adjustable steering column so that the position of the steering wheel can be altered with respect to the size and wishes of the driver.

U.S. Pat. No. 5,259,264 shows an arrangement for adjusting the steering wheel position in a motor vehicle by depressing a foot pedal to release an adjustment function. Although this arrangement permits the position of the steering wheel to be altered through a reasonably wide range of positions, it would be advantageous to provide a steering wheel arrangement which permits even greater adjustment possibilities. However, it is generally accepted that the greater the adjustment possibilities, the more complicated it becomes for the driver to find the ideal steering wheel position.

It is desirable to provide a steering wheel arrangement which permits a wide range of adjustment of the position of the steering wheel, whilst allowing relatively easy adjustment by the driver.

In accordance with an aspect of the present invention, a steering wheel arrangement is provided having the features of: a steering column having a first end for cooperation with a steering wheel and a second end for cooperation with a vehicle steering mechanism; a suspension arrangement for said steering column, said suspension arrangement comprising: a first supporting arm having a first end and a second end, said first end being pivotally connected to the vehicle via a first pivot joint, a second supporting arm having a first end and a second end, said first end being pivotally connected to the second end of said first supporting arm via a second pivot joint, and said second end being pivotally connected to said steering column via a third pivot joint, said first, second and third pivot joints comprising first, second and third locking arrangements, respectively; said steering wheel arrangement further comprising a foot pedal initially depressible to a first position associated with a distinct stop caused by a force increase and depressible to a subsequent second position by overcoming said force increase, wherein in said first position said foot pedal is arranged to release either one or two of said first, second and third locking arrangements to thereby permit adjustment of the steering wheel arrangement about said pivot joint(s) associated with said respective locking arrangement(s), and in said second position said foot pedal is arranged to lock said locking arrangement(s) released in said first position of said foot pedal and release the remaining locking arrangement(s) to permit further adjustment of the steering wheel arrangement.

Due to the fact that there are three adjustable pivot points and that only one or two of the three pivot joints are adjustable in a first step depressing the foot pedal to a first position and only the remaining of the three pivot joints are adjustable in a second step depressing the foot pedal to a second position, the adjustments can be made in a secure way by the driver during the ride.

DETAILED DESCRIPTION

Figure 1:
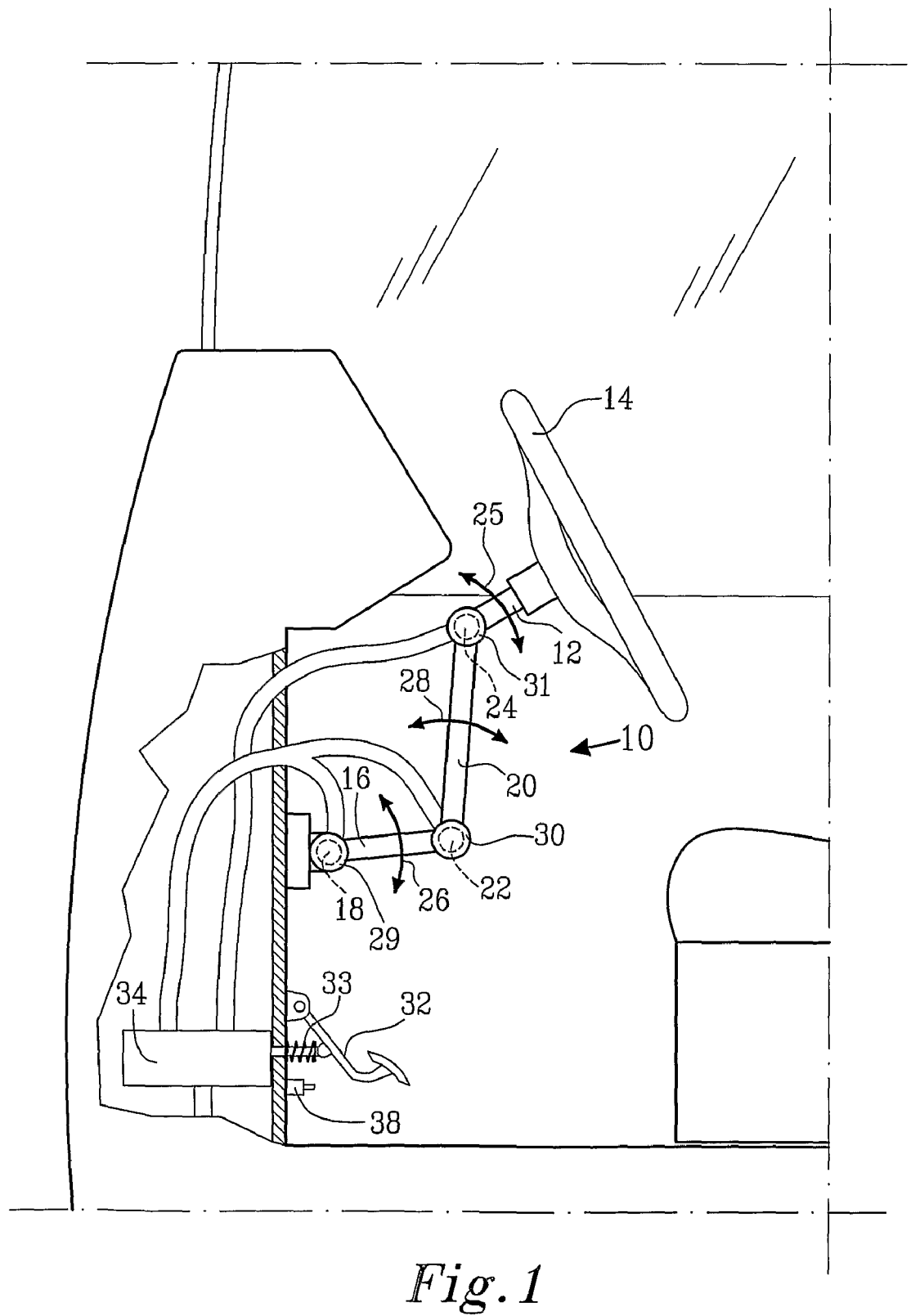
FIG. 1 shows a schematic view of a steering wheel arrangement of the present invention.

FIG. 1 shows a steering wheel arrangement 10 for a motor vehicle. The steering wheel arrangement comprises a steering column 12 having a first end for cooperation with a steering wheel 14 and a second end for cooperation with a vehicle steering mechanism (not shown).

The steering wheel arrangement 10 comprises a suspension arrangement for the steering column 12, which suspension arrangement comprises a first supporting arm 16 having a first end and a second end. The first end is pivotally connected to the vehicle via a first pivot joint 18. The pivot joint 18 may be fixed to the vehicle by bearings in a bracket solidly joined to the vehicle. The bracket may be mounted directly in a pedal plate or a supporting portion of the vehicle cab, e.g. a wind shield beam.

The suspension arrangement further comprises a second supporting arm 20 having a first end and a second end. The first end is pivotally connected to the second end of the first supporting arm 16 via a second pivot joint 22. The second end is pivotally connected to the steering column 12 via a third pivot joint 24. This third pivot joint 24 permits the angle of the steering wheel 14 to be adjusted, i.e. allows the steering wheel to be tillable as depicted by arrow 25. The first and second supporting arms 16, 20 act as an adjustable suspension arrangement which arrangement makes possible the pattern of movement depicted by the arrows 26 and 28 in FIG. 1. The supporting arms 16 and 20 and the steering column 12 can be swung in the same or different directions from an intermediate normal position. E.g. if the movement is counter clockwise, then the steering wheel 14 may be moved upwards and forwards as mentioned above, to thereby provide a large free space for facilitating entry and exit of the vehicle.

The first, second and third pivot joints 18, 22 and 24 comprise first, second and third locking arrangements 29, 30 and 31, respectively. The first locking arrangement 29 locks the first pivot joint 18, i.e. locks the first supporting arm 16 relative to the vehicle. The second locking arrangement 30 locks the second pivot joint 22, i.e. locks the second supporting arm 20 relative to the first supporting arm 16. The third locking arrangement 31 locks the third pivot joint 24, i.e. locks the steering column 12 relative to the second supporting arm 20. The locking arrangements 29, 30 and 31 may be any suitable locking arrangement, e.g. a package of friction plates, as described in U.S. Pat. No. 5,259,264.

For convenient operation of the locking arrangements 29, 30 and 31 of the steering wheel arrangement 10, a foot pedal 32 is used as depicted in FIG. 1. An advantage of using a foot pedal is that the driver can keep both hands on the steering wheel during adjustment.

Figure 2A:
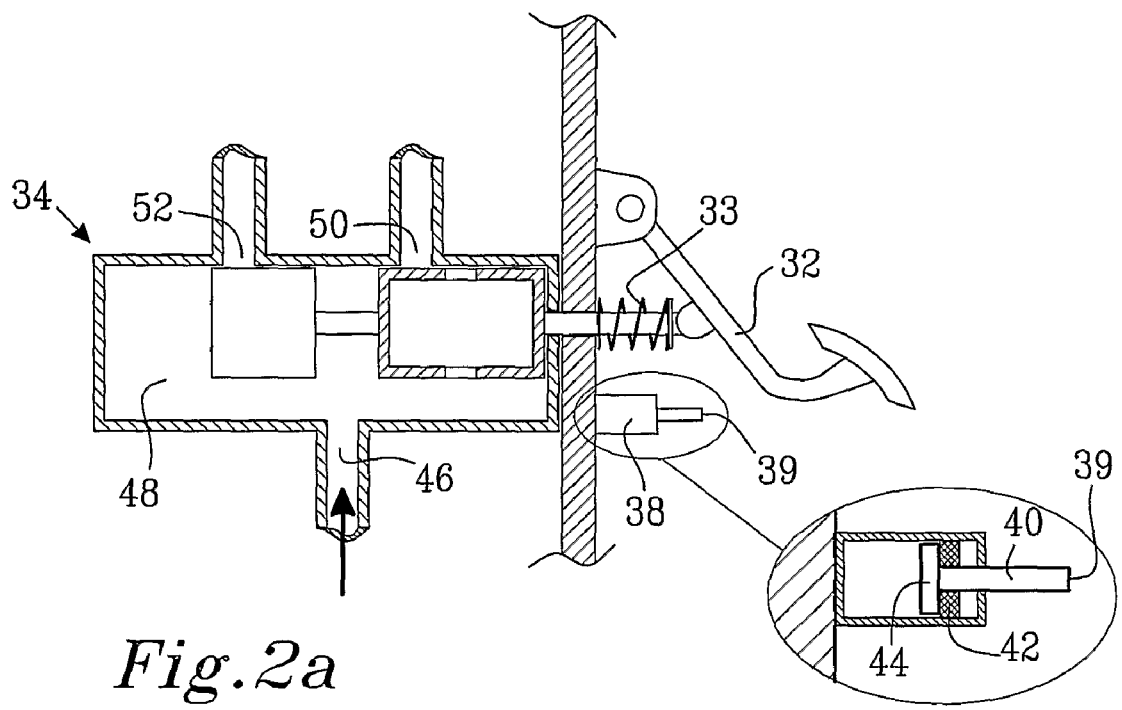
FIGS. 2a, b and c depict an example embodiment of a pneumatic release arrangement and a magnetic plunger according to the present invention.
Figure 2B:
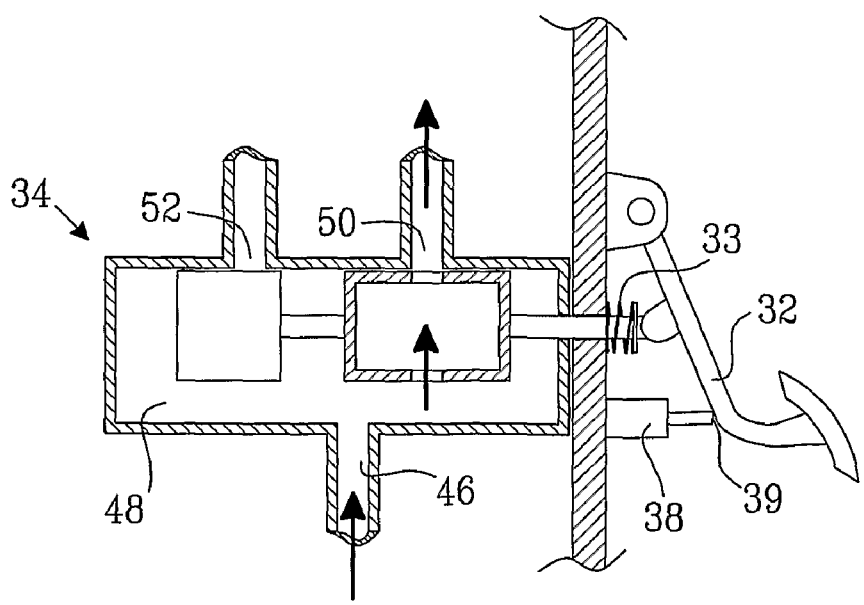

If all three pivot joints 18, 22 and 30 were adjustable simultaneously, the steering wheel arrangement would be hard to control, being too "loose-jointed" and unsuitable for adjustment during the ride. Therefore an adjustment in two steps makes adjustment during the ride more secure. The foot pedal 32 in accordance of the present invention is depressible to a first position and then to a second position making it possible to carry out the adjustment in two steps using the same foot pedal as can be seen from FIGS. 2b and 2c. Starting from the position depicted in FIG. 2a, the foot pedal 32 is initially depressible e.g. against a small resistance from a first spring 33, to a first position, see FIG. 2b associated with a distinct stop caused by a force increase and depressible to a subsequent second position see FIG. 2c by overcoming said force increase such that a driver depressing the foot pedal 32 will feel the distinct stop when the pedal reaches the first position. This prevents the foot pedal 32 from being depressed to the second position by mistake. The force increase may be realized in a suitable way e.g. by a magnetic plunger 38 as shown in FIGS. 2a, b and c. The foot pedal 32 is depressed until it reaches a first end 39 of a rod 40; this corresponds to the first position. The rod extends through a magnet 42 and is at its second end mounted to a ferrous element 44. The ferrous element 44 is forced against the magnet 42 by magnetic flux and, as shown in FIG. 2b, hinders the foot pedal 32 from continuing to the second position by mistake. When the foot pedal in the first position is further depressed, it displaces the rod 40 so that the magnetic force is overcome and the ferrous plate 44 is released from the magnet 42, to result in the position shown in FIG. 2c. The foot pedal 32 can thus be depressed to the second position. It will be clear to the skilled person that, as a variant, the plate 44 may be substituted by a magnet. In such a case the "magnet" 42 through which the rod passes will be made of ferrous material. The force increase may also be realized in other suitable ways e.g. by a second spring of e.g. rubber or metallic acting on the foot pedal 32 when the foot pedal 32 reaches the first position, i.e. the distinct stop associated with this first position is realized by the force of the second spring. The second spring force may remain during the release to the second position.

The steering wheel arrangement 10 further comprises a release arrangement 34. The release arrangement 34 may for example be mechanical as in the form of a release cable 36 as depicted in FIGS. 3a and 3b, pneumatic in the form of pneumatic switches 50, 52, as depicted in FIGS. 1, 2a, 2b and 2c, or hydraulic (not shown). The foot pedal 32 (see FIG. 1) controls the locking arrangement 29, 30 and 31 of each of the three pivot joints 18, 22 and 24 by means of the release arrangement 34 such that in its first position the foot pedal 32 is arranged to release, via the release arrangement 34, either one or two of the first, second and third locking arrangements 29, 30 and 31 to thereby permit adjustment of the steering wheel arrangement 10 about the pivot joint(s) associated with the respective locking arrangement(s). In its second position the foot pedal 32 is arranged to, via the release arrangement 34, lock the locking arrangement(s) released in the first position of said foot pedal 32 and release the remaining locking arrangement(s) to permit 5 further adjustment of the steering wheel arrangement 10.

According to one embodiment of the present invention, in the unloaded state, i.e. when the foot pedal 32 is not depressed, each of the first, second and third locking arrangements 29, 30 and 31 is in a locked state. The suspension arrangement and steering column 12 are thus fixed in a set position. When the foot pedal 32 is depressed to the first position, the first locking arrangement 29 and the second locking arrangement 30 are released. This causes that the first pivot joint 18 and the second pivot joint 22 become adjustable. In the first position the third locking arrangement 31 is still locked and the third pivot joint 24 is unable to be adjusted.

The first and second supporting arms 16 and 20 can be swung (in the pattern of movement shown by arrows 26 and 28 in FIG. 1) in a suitable direction to set the suspension arrangement in the desired position.

When the foot pedal 32 is further depressed, by overcoming the force increase provided by the magnetic plunger 38, the first locking arrangement 29 and the second locking arrangement 30 become locked. This renders the first pivot joint 18 and the second pivot joint 22 unadjustable. The suspension arrangement is thus fixed in its set position. However, the third locking arrangement 31 is released, making the third pivot joint 24 adjustable. The steering column 12 can now be adjusted to a desired position. The pattern of movement is represented by the arrow 25 in FIG. 1.

If only the steering column 12 is to be adjusted, the foot pedal 32 can be depressed passed the first position direct by to the second position, in which only the third pivot joint 24 and thus the steering column 12 is adjustable. If only the suspension arrangement requires adjustment, the foot pedal 32 is released after the desired adjustment has been made in the first position.

In one embodiment of the present invention the release arrangement 34 is 30 pneumatic and is shown in FIGS. 2a, b and c. The pneumatic release arrangement comprises a passage 46 through which air is flushed into a chamber 48. It further comprises a first pneumatic switch 50 connected to and controlling the first locking arrangement 39 and the second locking arrangement 30. When the first switch 50 is open, air flushes from the chamber 48 via the switch 50 and acts on the first locking 35 arrangement 29 and the second locking arrangement 30 such that they release and the first and second pivot joints 18 and 22 become adjustable. The first and second supporting arms 16 and 20 can then be swung (in the pattern of movement shown by the arrows 26 and 28 in FIG. 1) in the suitable direction to set the suspension arrangement to the desired position. When the first pneumatic switch 50 is closed, no air can flush from 5 the chamber 48 via the switch 50, and the first locking arrangement 29 and the second locking arrangement 30 are in locked positions and the first and second pivot joints 18 and 22 are no longer adjustable. The suspension arrangement is thus fixed in its set position.

The pneumatic release arrangement further comprises a second pneumatic switch 52 connected to and controlling the third locking arrangement 31. When the second switch 52 is open, air can flush from the chamber 48 via the second switch 52 to act on the third locking arrangement 31 such that it releases and renders the third pivot joint 24 adjustable. When the second switch 52 is closed, no air can flush from the chamber 48 via the second switch 52. The third locking arrangement 31 is then in a locked position and the third pivot joint 24 is no longer adjustable. The steering column 12 is thus fixed in its set position.

FIG. 2a depicts the pneumatic release arrangement in a position where the foot pedal 32 is not depressed. In this position, the first pneumatic switch 50 and the second pneumatic switch 52 are closed. The suspension arrangement and the steering column 12 are thus fixed in a set position.

FIG. 2b depicts the pneumatic release arrangement in a position where the foot pedal 32 is depressed to the first position. In this position, the first pneumatic switch 50 is open and the second pneumatic switch 52 is closed. The suspension arrangement is then adjustable while the steering column 12 remains fixed in the set position.

Figure 2C:
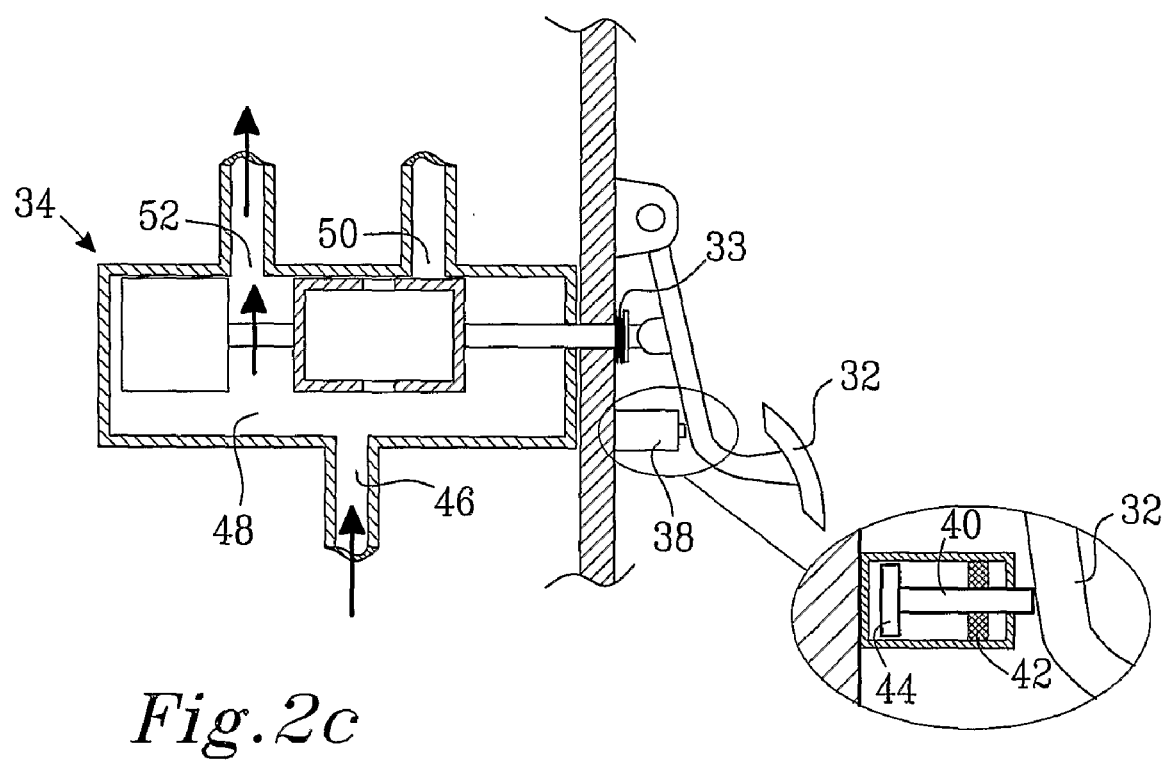
Figure 3A:
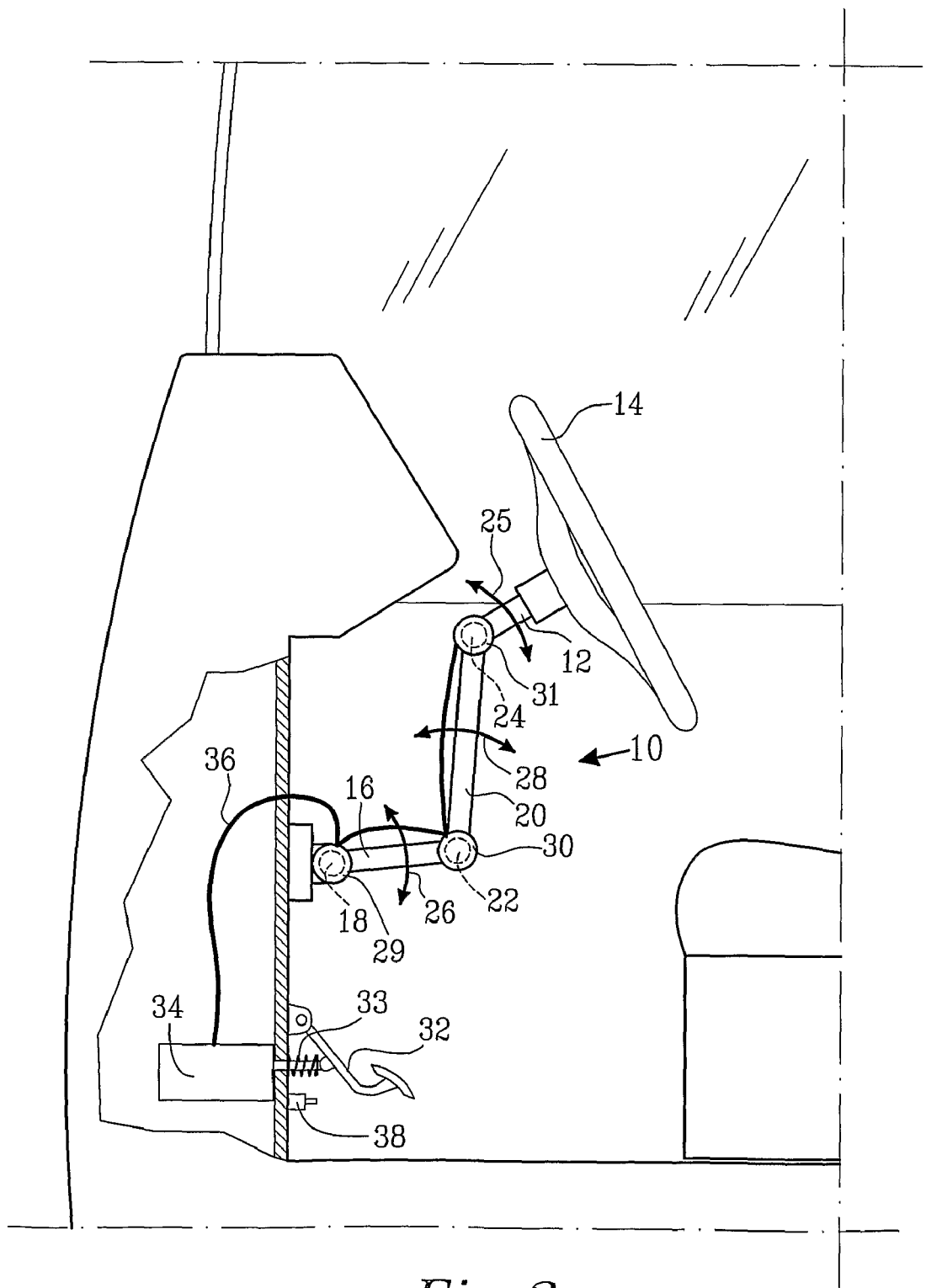
FIGS. 3a and b depict two example embodiments of a mechanical release arrangement.
Figure 3B:
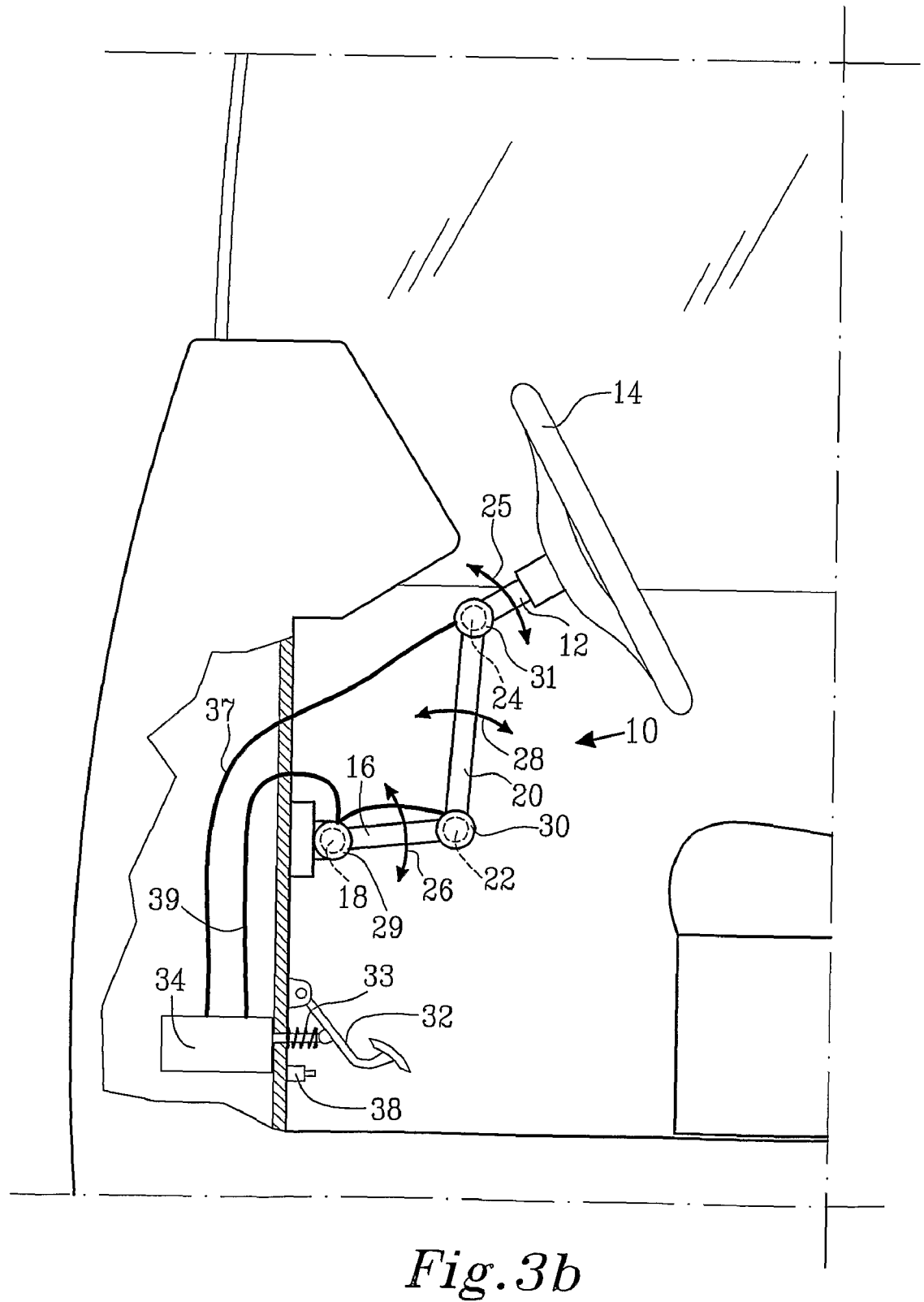

FIG. 2c depicts the pneumatic release arrangement in a position where the foot pedal 32 is depressed to the second position. In this position, the first pneumatic switch 50 is closed and the second pneumatic switch 52 is open. The suspension arrangement is then fixed in its set position and the steering column 12 becomes adjustable. The release arrangement 34 may also be hydraulic, being arranged as the pneumatic release arrangement above, but using oil instead of air in the switches.

The release arrangement 34 may also be mechanical. FIG. 3a depicts a mechanical release arrangement comprising a release cable 36 being connected to the foot pedal 32 and controls the locking arrangement 29, 30 and 31 of each of the three 35 pivot joints. When the foot pedal 32 is depressed to the first position, the release cable releases the first locking arrangement 29 and the second locking arrangement 30 in a suitable way, e.g. by disconnecting a slider with a cam in each respective locking arrangement 29, 30 and 31, which cam will release a locking spring or similar. The third locking arrangement 31 remains locked. When the foot pedal 32 is depressed to the second position, a further connection 22 of the release cable to the third locking arrangement 31 will then release the third locking arrangement 31 via another cam. This may be attained by using an eccentric cam. The first and second locking arrangements 29 and 30 then become locked.

FIG. 3b depicts an alternative mechanical release arrangement, wherein two release cables 37, 39 may be connected directly by the foot pedal 32 to the locking arrangements 29,30,31 such that when the foot pedal 32 is depressed to the first position a first release cable 37 releases the first and second locking arrangement 29 and 30. The third locking arrangement 31 remains locked. When the foot pedal 32 is depressed to the second position, a second release cable 39 releases the third locking arrangement 31. The first and second locking arrangements 29 and 30 become locked. This may also be attained by an eccentric cam arrangement.

In accordance with the invention, it matters not in which order the adjustment steps are performed, e.g. the third pivot joint 24 may be adjustable in a first step and the first and second pivot points 18 and 22 in a second step or the third and the first pivot points 24 and 18 in a first step and the second pivot point 22 in a second step, etc.

The invention claimed is:

1. A steering wheel arrangement for a motor vehicle, comprising
    a steering column having a first end for cooperation with a steering wheel and a second end for cooperation with a vehicle steering mechanism;
    a suspension arrangement for the steering column, the suspension arrangement comprising:
        a first supporting arm having a first end and a second end, the first end being pivotally connected to the vehicle via a first pivot joint,
        a second supporting arm having a first end and a second end, the first end being pivotally connected to the second end of the first supporting arm via a second pivot joint, and the second end being pivotally connected to the steering column via a third pivot joint, the first, second and third pivot joints comprising first, second and third locking arrangements, respectively;
    the steering wheel arrangement further comprising
        a foot pedal initially depressible to a first position associated with a distinct stop caused by a force increase and depressible to a subsequent second position by overcoming the force increase,
    wherein in the first position the foot pedal is arranged to release at least one and less than all of the first, second and third locking arrangements to thereby permit adjustment of the steering wheel arrangement about respective ones of the pivot joints associated with the at least one and less than all of the first, second and third locking arrangements, and in the second position the foot pedal is arranged to lock the at least one and less than all of the first, second and third locking arrangements released in the first position of the foot pedal and release the at least one and less than all of the first, second and third locking arrangements that were locked in the first position of the foot pedal to permit further adjustment of the steering wheel arrangement.

2. The steering wheel arrangement according to claim 1, wherein the force increase is realized by a magnetic plunger comprising a magnet acting on a ferrous element by magnetic force, wherein the foot pedal is depressible until it reaches the magnetic plunger corresponding to the first position, the magnetic force hindering the foot pedal from continuing to the second position and wherein the foot pedal is further depressible to reach the second position by overcoming the magnetic force such that the ferrous element is released from the magnet.

3. The steering wheel arrangement according to claim 1, wherein the force increase is realized by a second spring acting on the foot pedal when the foot pedal reaches the first position.

4. The steering wheel arrangement according to claim 1, wherein the foot pedal is arranged to release the first, second and third locking arrangements by means of a release arrangement.

5. The steering wheel arrangement according to claim 4, wherein the release arrangement is pneumatic and comprises a first pneumatic switch connected to the foot pedal and controlling the at least one and less than all of the first, second and third locking, arrangements and comprising a second pneumatic switch controlling the at least one and less than all of the first, second and third locking arrangements that were locked in the first position of the foot pedal.

6. The steering wheel arrangement according to claim 4, wherein the release arrangement is mechanical and comprises a release cable connected to the foot pedal and controlling the locking arrangements.

7. The steering wheel arrangement according to claim 4, wherein the release arrangement is mechanical and comprises a first release cable being connected to the foot pedal and controlling the at least one and less than all of the first, second and third locking arrangements and comprising a second release cable controlling the at least one and less than all of the first, second and third locking arrangements that were locked in the first position of the foot pedal.

8. The steering wheel arrangement according to claim 4, wherein the release arrangement is hydraulic and comprises a first hydraulic switch being connected to the foot pedal and controlling the at least one and less than all of the first, second and third locking arrangements and comprising a second hydraulic switch controlling the at least one and less than all of the first, second and third locking arrangements that were locked in the first position of the foot pedal.

9. The steering wheel arrangement according to claim 1, wherein in the first position the foot pedal is arranged to release the second and third locking arrangements to thereby permit adjustment of the steering wheel arrangement about the pivot joints associated with the respective locking arrangements, and in the second position the foot pedal is arranged to lock the locking arrangements released in the first position of the foot pedal and release the first locking arrangement to permit further adjustment of the steering wheel arrangement.

10. The steering wheel arrangement according to claim 1, wherein in the first position the foot pedal is arranged to release the first and second locking arrangements to thereby permit adjustment of the steering wheel arrangement about the pivot joints associated with the respective locking arrangements, and in the second position the foot pedal is arranged to lock the locking arrangements released in the first position of the foot pedal and release the third locking arrangement to permit further adjustment of the steering wheel arrangement.

11. The steering wheel arrangement according to claim 1, wherein in the first position the foot pedal is arranged to release the first and third locking arrangements to thereby permit adjustment of the steering wheel arrangement about the pivot joints associated with the respective locking arrangements, and in the second position the foot pedal is arranged to lock the locking arrangements released in the first position of tee foot pedal and release the second locking arrangement to permit further adjustment of the steering wheel arrangement.

12. The steering wheel arrangement according to claim 1, wherein in the first position the foot pedal is arranged to release the first locking arrangement to thereby permit adjustment of the steering wheel arrangement about the pivot joint associated with the respective locking arrangement, and in the second position the foot pedal is arranged to lock the locking arrangement released in the first position of the foot pedal and release the second and third locking arrangements to permit further adjustment of the steering wheel arrangement.

13. The steering wheel arrangement according to claim 1, wherein in the first position the foot pedal is arranged to release the second locking arrangement to thereby permit adjustment of the steering wheel arrangement about the pivot joint associated with the respective locking arrangement, and in the second position the foot pedal is arranged to lock the locking arrangement released in the first position of the foot pedal and release the first and third locking arrangements to permit further adjustment of the steering wheel arrangement.

14. The steering wheel arrangement according to claim 1, wherein in the first position the foot pedal is arranged to release the third locking arrangement to thereby permit adjustment of the steering wheel arrangement about the pivot joint associated with the respective locking arrangement, and in the second position the foot pedal is arranged to lock the locking arrangement released in the first position of the foot pedal and release the first and second locking arrangements to permit further adjustment of the steering wheel arrangement.

\* \* \* \* \*

UNITED STATES PATENT AND TRADEMARK OFFICE
CERTIFICATE OF CORRECTION

PATENT NO.        : 8,117,940 B2                         Page 1 of 1
APPLICATION NO.   : 12/091755
DATED             : February 21, 2012
INVENTOR(S)       : Bjorn Andersson et al.

It is certified that error appears in the above-identified patent and that said Letters Patent is hereby corrected as shown below:

Title page, item [73] assignees: should be --Volvo Lastvagnar AB--.

Title page, item [73] the country of both of the assignees should be changed from "(CH)" to --(SE)--.

Signed and Sealed this
Tenth Day of April, 2012

David J. Kappos
*Director of the United States Patent and Trademark Office*